United States Patent
Mugeraya et al.

(10) Patent No.: US 12,134,479 B2
(45) Date of Patent: **\*Nov. 5, 2024**

(54) READINESS INDICATOR LIGHT SYSTEM HAVING PROJECTION LIGHT FOR EVACUATION SLIDE

(71) Applicant: Goodrich Corporation, Charlotte, NC (US)

(72) Inventors: Bhavik Mugeraya, Bangalore (IN); Priyank Anavadiya, Bangalore (IN); Apoorva Bajpai, Kanpura (IN)

(73) Assignee: GOODRICH CORPORATION, Charlotte, NC (US)

( * ) Notice: Subject to any disclaimer, the term of this patent is extended or adjusted under 35 U.S.C. 154(b) by 108 days.

This patent is subject to a terminal disclaimer.

(21) Appl. No.: 17/831,300

(22) Filed: Jun. 2, 2022

(65) Prior Publication Data

US 2023/0174243 A1    Jun. 8, 2023

(30) Foreign Application Priority Data

Dec. 3, 2021 (IN) .............................. 202141056153

(51) Int. Cl.
*B64D 25/14* (2006.01)
*B64D 47/02* (2006.01)

(52) U.S. Cl.
CPC ............ *B64D 25/14* (2013.01); *B64D 47/02* (2013.01)

(58) Field of Classification Search
CPC ...................................................... B64D 25/14
See application file for complete search history.

(56) References Cited

U.S. PATENT DOCUMENTS

| 4,333,546 | A  | 6/1982 | Fisher |
| 6,443,259 | B1 | 9/2002 | Oney |
| 8,952,828 | B2 | 2/2015 | Kohlmeier-Beckmann et al. |
| 9,309,002 | B2 | 4/2016 | Fellmann et al. |

(Continued)

FOREIGN PATENT DOCUMENTS

| EP | 3339179 | 10/2020 | |
| WO | WO-2020030735 A1 * | 2/2020 | ........... B64C 1/1423 |

OTHER PUBLICATIONS

Wikipedia, Evacuation Slide, Feb. 24, 2014, [web.archive.org/web/201402224030343/https://en.wikipedia.org/wiki/Evacuation_slide] (Year: 2014).*

(Continued)

*Primary Examiner* — Timothy D Collins
*Assistant Examiner* — Justin Michael Heston
(74) *Attorney, Agent, or Firm* — SNELL & WILMER L.L.P.

(57) ABSTRACT

An evacuation slide light system may comprise a sensor, a controller configured to receive a signal from the sensor, and a projector light operably coupled to the controller. The sensor may be configured to measure at least one of a pressure of the evacuation slide or a stretch of a material of the evacuation slide. The controller may determine the pressure of the evacuation slide based on the signal from the sensor. The controller may be configured to command the projector light to emit a first image if the pressure of the evacuation slide is less than a threshold pressure and to emit a second image if the pressure of the evacuation slide is greater than or equal to the threshold pressure.

20 Claims, 14 Drawing Sheets

(56) References Cited

U.S. PATENT DOCUMENTS

| | | | |
|---|---|---|---|
| 2004/0094671 A1* | 5/2004 | Moro | B64D 25/14 244/137.2 |
| 2014/0009274 A1* | 1/2014 | Kohlmeier-Beckmann | A62B 3/00 340/425.5 |
| 2020/0290751 A1 | 9/2020 | Waffler et al. | |
| 2021/0086870 A1 | 3/2021 | Haynes et al. | |
| 2021/0114746 A1 | 4/2021 | Schallenberg et al. | |
| 2021/0147090 A1 | 5/2021 | Jurlina et al. | |
| 2021/0221523 A1 | 7/2021 | Haynes et al. | |
| 2021/0331811 A1* | 10/2021 | Lenaburg | B64D 47/02 |
| 2021/0354835 A1* | 11/2021 | John | F16K 17/32 |
| 2022/0380058 A1* | 12/2022 | John | B64D 25/14 |

OTHER PUBLICATIONS

European Patent Office, European Search Report dated Apr. 25, 2023 in Application No. 22211058.7.

European Patent Office, European Office Action dated Aug. 21, 2024 in Application No. 22211058.7.

\* cited by examiner

READINESS INDICATOR LIGHT SYSTEM HAVING PROJECTION LIGHT FOR EVACUATION SLIDE

CROSS-REFERENCE TO RELATED APPLICATIONS

This application claims priority to, and the benefit of, India Patent Application No. 202141056153, filed Dec. 3, 2021 (DAS Code 8FA4) and entitled "READINESS INDICATOR LIGHT SYSTEM HAVING PROJECTION LIGHT FOR EVACUATION SLIDE," which is incorporated by reference herein in its entirety for all purposes.

FIELD

The present disclosure relates to aircraft evacuation systems and, in particular, to an evacuation slide light system having one or more projector lights to indicate an inflation status of the evacuation slide.

BACKGROUND

Emergency evacuation systems, including inflatable evacuation slides, may be used to exit an aircraft in the absence of a jet way or other suitable means of egress for passengers. The evacuation slides may deploy, for example, from the side of an aircraft fuselage. Evacuation systems may include a readiness indicator, which indicates to evacuees whether the slide is fully deployed and/or in a position to safely covey evacuees to an exit surface. Current readiness indicators may inflate during slide inflation. However, the indicators can be difficult to see and/or understand and may be less effective in high winds.

SUMMARY

An evacuation slide light system is disclosed herein. In accordance with various embodiments, the evacuation slide light system may comprise a sensor configured to measure at least one of a pressure of an evacuation slide or a stretch of a material of the evacuation slide, a controller configured to receive a signal from the sensor, and a projector light operably coupled to the controller. The controller may be configured to determine the pressure of the evacuation slide based on the signal received from the sensor. The controller may be configured to command the projector light to emit a first image in response to determining the pressure of the evacuation slide is less than a threshold pressure and to emit a second image in response to determining the pressure of the evacuation slide is greater than or equal to the threshold pressure.

In various embodiments, the controller may be configured to monitor the pressure of the evacuation slide using the signal received from the sensor. The controller may be configured to cause an image emitted by the projector light to change from the second image to the first image in response to determining the pressure of the evacuation slide has decreased to below the threshold pressure.

In various embodiments, the controller may be configured to command the projector light to output an illumination area having a first color in response to receiving an inflation initiation signal. The controller may be configured to command the projector light to change a color of the illumination from the first color to a second color in response to determining the pressure of the evacuation slide is greater than or equal to the threshold pressure.

In various embodiments, controller may be configured to receive an inflation initiation signal in response to the evacuation slide being deployed. The controller may be configured to cause the projector light to emit a complete failure image in response to determining the pressure of the evacuation slide has not reached the threshold pressure within a threshold duration of time after receiving the inflation initiation signal.

In various embodiments, the first image comprises at least one of an X, a stop word, or a red octagonal stop sign. In various embodiments, the second image comprises at least one of a green arrow, a white arrow, or a go word.

In various embodiments, a photodetector may be operably coupled the controller. The controller may determine a brightness for the projector light based on a light level signal received from the photodetector.

An article of manufacture including a tangible, non-transitory computer-readable storage medium having instructions stored thereon for controlling an evacuation slide light system is also disclosed herein. In accordance with various embodiments, the instructions, in response to execution by a controller, cause the controller to perform operations, which may comprise receiving, by the controller, a signal from a sensor operably coupled to an evacuation slide; determining, by the controller, a pressure of the evacuation slide based on the signal from the sensor; determining, by the controller, a desired image to be emitted by a projector light based on the pressure of the evacuation slide; and commanding, by the controller, the projector light to emit the desired image.

In various embodiments, determining, by the controller, the desired image comprises comparing, by the controller, the pressure of the evacuation slide to a threshold pressure. In various embodiments, commanding, by the controller, the projector light to emit the desired image comprises commanding, by the controller, the projector light to display a first image in response to the controller determining the pressure of the evacuation slide is less than the threshold pressure.

In various embodiments, commanding, by the controller, the projector light to emit the desired image comprises commanding, by the controller, the projector light to display a second image in response to the controller determining the pressure of the evacuation slide is greater than or equal to the threshold pressure.

In various embodiments, the first image comprises at least one of an X, a stop word, or a red octagonal stop sign, and the second image comprises at least one of a green arrow, a white arrow, or a go word.

In various embodiments, the sensor may be configured to measure a stretch of a material of the evacuation slide.

In various embodiments, the operations may further comprise receiving, by the controller, an inflation initiation signal; commanding, by the controller, the projector light to emit a first image in response to receiving the inflation initiation signal; determining, by the controller, whether the pressure of the evacuation slide is equal to or greater than a threshold pressure at a preselected duration of time after receipt of the inflation initiation signal; and commanding, by the controller, the projector light to emit a complete failure image in response to determining that at the preselected duration of time the pressure of the evacuation slide is less than the threshold pressure.

An evacuation slide is also disclosed herein. In accordance with various embodiments, the evacuation slide may comprise an inflatable rail structure and an evacuation slide light system coupled to the inflatable rail structure. The evacuation slide light system may include a plurality of projector lights located along the inflatable rail structure.

In various embodiments, the evacuation slide light system further comprises a switch, a lanyard coupled to the inflatable rail structure and configured to translate the switch between a first state and a second state; and a controller coupled to the switch. The controller may be configured to determine whether the switch is in the first state or the second state, and to command the first projector light to emit a first image in response to determining the switch is in the first state, and to command the first projector light to emit a second image in response to determining the switch is in the second state. In various embodiments, the lanyard is coupled to a toe end of the evacuation slide.

In various embodiments, the evacuation slide light system further comprises a sensor configured to measure at least one of a pressure of the evacuation slide or a stretch of a material of the evacuation slide, and a controller configured to receive a signal from the sensor. The controller may be configured to determine the pressure of the evacuation slide based on a signal received from the sensor. The controller may be configured to command the first projector light to emit a first image in response to determining the pressure of the evacuation slide is less than a threshold pressure and to emit a second image in response to determining the pressure of the evacuation slide is greater than or equal to the threshold pressure.

In various embodiments, a first projector light of the plurality of projector lights is located at a toe end of the evacuation slide. The first projector light may be configured to output a caution image including a plurality of diagonally oriented yellow and black stripes.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full, and/or any other possible attachment option.

Throughout the present disclosure, like reference numbers denote like elements. Accordingly, elements with like element numbering may be shown in the figures but may not necessarily be repeated herein for the sake of clarity.

Figure 1:
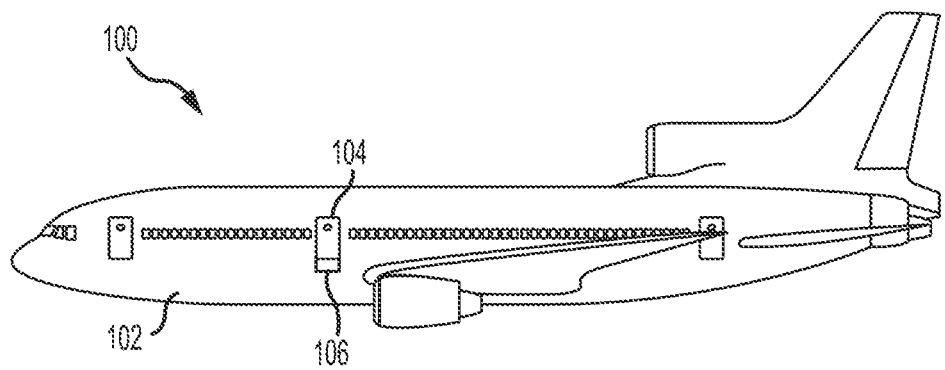
FIG. 1 illustrates an aircraft having an evacuation system, in accordance with various embodiments.

With reference to FIG. 1, an exemplary aircraft 100 is shown, in accordance with various embodiments. Aircraft 100 may comprise a fuselage 102 having plurality of exit doors, including an exit door 104. Aircraft 100 may include one or more evacuation assemblies positioned near a corresponding exit door. For example, aircraft 100 includes an evacuation assembly 106 positioned near exit door 104. In the event of an emergency, exit door 104 may be opened by a passenger or crew member of aircraft 100. Evacuation assembly 106 may deploy in response to exit door 104 being opened or in response to another action taken by a passenger or crew member, such as, for example depression of a button, actuation of a lever, or similar action.

Figure 2A:
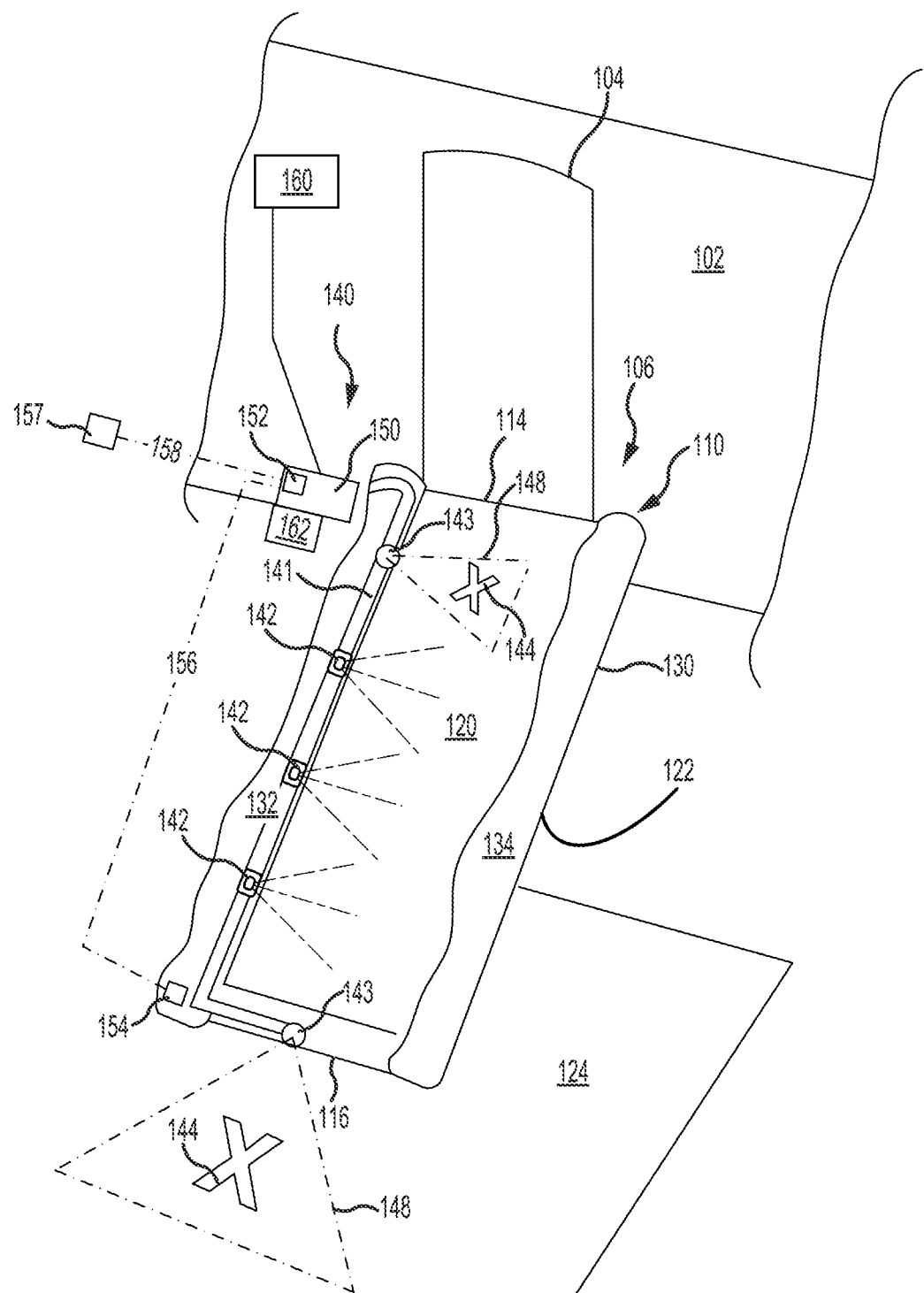
FIG. 2A illustrates an evacuation slide in a partially inflated state, in accordance with various embodiments.
Figure 2B:
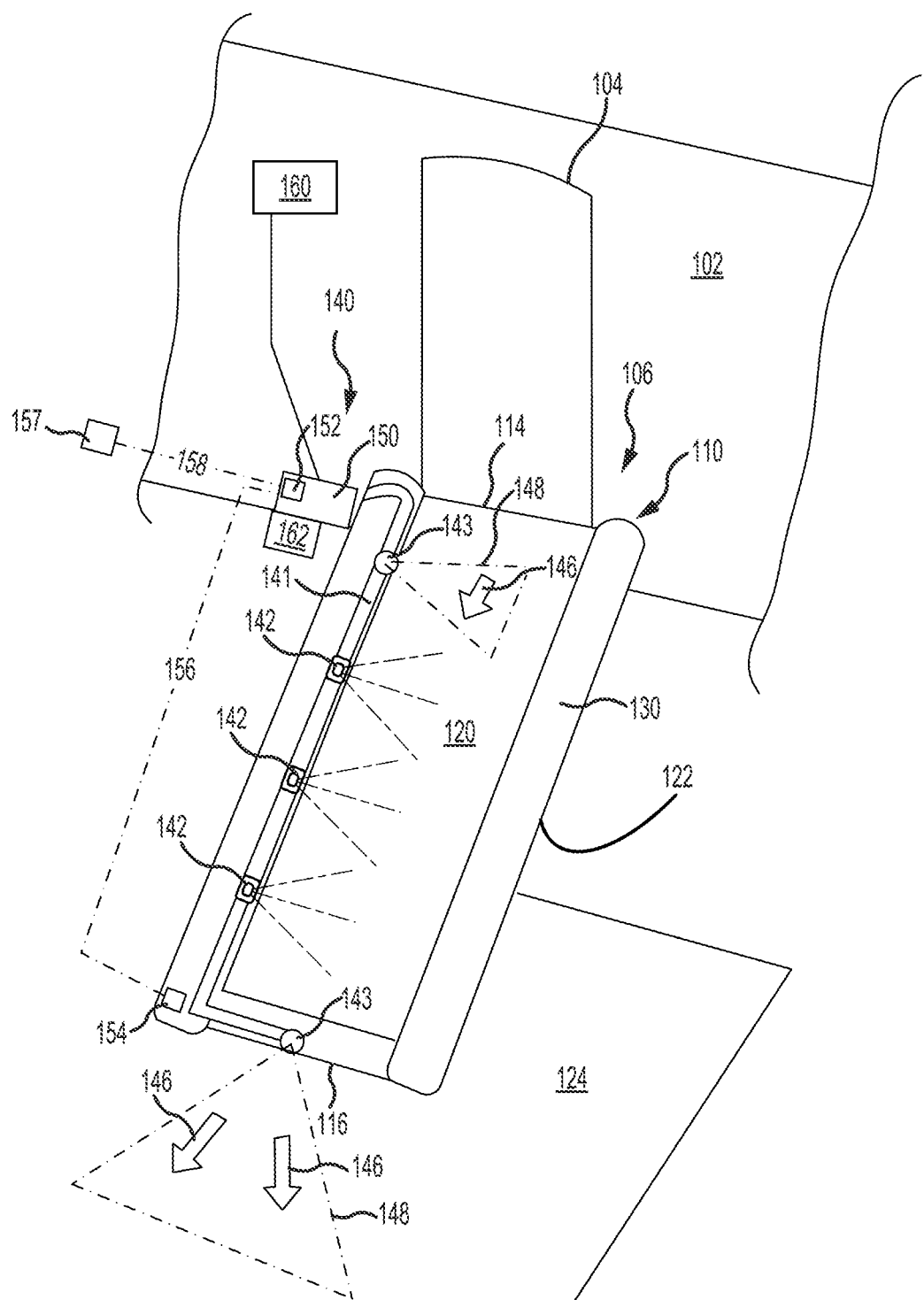
FIG. 2B illustrates an evacuation slide in a fully inflated state, in accordance with various embodiments.

With reference to FIGS. 2A and 2B, an inflatable evacuation slide 110 of evacuation assembly 106 is illustrated in a partially inflated state (also referred to as a partially deployed position) and a fully inflated state (also referred to as a fully deployed position), respectively. Evacuation slide 110 may deploy from aircraft 100 in response to the opening of exit door 104. In accordance with various embodiments, evacuation slide 110 includes a head end 114 and a toe end 116 opposite head end 114. Head end 114 may be coupled to an aircraft structure, such as, for example, fuselage 102. Evacuation slide 110 includes a sliding surface 120 and an underside surface 122 opposite sliding surface 120. Sliding surface 120 extends from head end 114 to toe end 116. Evacuation slide 110 includes an inflatable rail structure 130 extending between head end 114 and toe end 116. Inflatable rail structure 130 includes, at least, a first siderail 132 and a second siderail 134. First and second siderails 132, 134 extend from head end 114 to toe end 116. First siderail 132 is located along a first side of sliding surface 120. Second siderail 134 is located along a second, opposite side of sliding surface 120.

In response to an evacuation event (i.e., upon deployment of evacuation slide 110), underside surface 122 may be oriented toward an exit surface 124 (e.g., toward the ground or toward a body of water). While evacuation slide 110 is illustrated as a single lane slide, it is contemplated and understood that evacuation slide 110 may include any number of lanes. In various embodiments, evacuation slide 110 may be an off-wing evacuation slide and may include a ramp portion located over the wing of aircraft 100 (i.e., evacuation slide 110 may include a ramp portion and a slide portion, where the ramp portion extends over the wing and between the exit door and the head end of the slide portion, and the slide portion extends from the end of the ramp portion opposite the exit door to the exit surface exit door). In various embodiments, evacuation slide 110 may be employed solely as slide. In various embodiments, evacuation slide 110 may be employed as a slide and also as a raft in the event of a water landing.

In accordance with various embodiments, evacuation slide 110 includes an evacuation slide light system 140. Evacuation slide light system 140 includes a light harness 141 having a plurality of standard, or non-projector, lights 142 and one or more projector lights 143 located thereon. As used herein, a non-projector light refers to a light that creates an illumination area which does not include an image, and a projector light refers to a light that projects one or more image(s) (e.g., word(s), a shape(s), symbol(s), design(s), etc.) in the illumination area of the light. Non-projector lights 142 and projector lights 143 may be located along inflatable rail structure 130. The lights located longitudinally along first siderail 132 may be oriented toward sliding surface 120. The lights located along toe end 116 may be oriented away from sliding surface 120 and toward exit surface 124. Non-projector lights 142 and projector lights 143 are configured to illuminate sliding surface 120 and to illuminate exit surface 124 proximate toe end 116. In an off-wing evacuation slide, non-projector lights 142 and/or projector lights 143 may also be located along the ramp portion. While FIGS. 2A and 2B illustrate non-projector lights 142 and/or projector lights 143 located along first siderail 132, it is contemplated and understood that, in various embodiments, non-projector lights 142 and/or projector lights 143 may be located along second siderail 134 or along first siderail 132 and second siderail 134.

In accordance with various embodiments, projector lights 143 are configured to indicate a readiness of evacuation slide 110. Each projector light 143 may be configured to display a first image 144 (FIG. 2A) or a second image 146 (FIG. 2B) within an illumination area 148 generated by the projector light 143. The first image 144 is configured to convey to passengers and crew that the evacuation slide 110 should not be entered. For example, first image 144 may be an "X", the word "STOP", a stop sign (e.g., red octagon), or similar image. In various embodiments, the first image 144 may be red in color and the illumination area 148 may be white. In various embodiments, the projector light 143 may produce a red illumination area 148 for use with the first image 144, and the first image 144 may be white or black. The second image 146 is configured to convey to passengers that the evacuation slide 110 is safe to enter. For example, second image 146 may be an arrow, a series of arrows, the word "GO", or similar image. In various embodiments, the second image 146 may be green in color and the illumination area 148 may be white. In various embodiments, the projector light 143 may produce a green illumination area 148 for use with the second image 146 and the second image 146 may be white or black. In this regard, the projector light 143 may also change the color of illumination area 148 in addition to change image 144, 146 being displayed.

In various embodiments, the second image 146 displayed by the projector lights 143 located along toe end 116 may also convey a direction in which evacuees should go after exiting the slide. For example, and with particular reference to FIG. 2B, in various embodiments, the second image 146 may be arrows which guide evacuees in one or more directions away from the evacuation slide 110. Providing directional guidance can help avoid crowding at the toe end 116 of the evacuation slide 110 and/or decrease evacuation times.

In various embodiments, each of the projector light(s) 143 may be used to replace one or more of the non-projector lights 142 in light harness 141. In this regard, evacuation slide light system 140 may be retrofit into current light harnesses. Stated differently, projector lights 143 for indicating slide readiness may be used in light harnesses that were previously employed solely for slide illumination.

The location of projector lights 143 may be selected such that images 144, 146 displayed by projector lights 143 are readily visible to evacuees and/or crew located at exit door 104 and/or in aircraft 100. For example, in various embodiments, projector lights 143 may be employed along first siderail 132 proximate head end 114 and non-projector lights 142 may be employed along first siderail 132 proximate toe end 116. Stated differently, projector lights 143 may be located between head end 114 and a slide midpoint, which is halfway between head end 114 and toe end 116, and non-projector lights 142 may be located between toe end 116 and the slide midpoint 174. It should be appreciated that the configurations of projector lights 143 and non-projector lights 142 disclosed herein are provided as examples and other configurations of projector lights 143 and non-projector lights 142 are contemplated and within the scope of the present disclosure.

Figure 3:
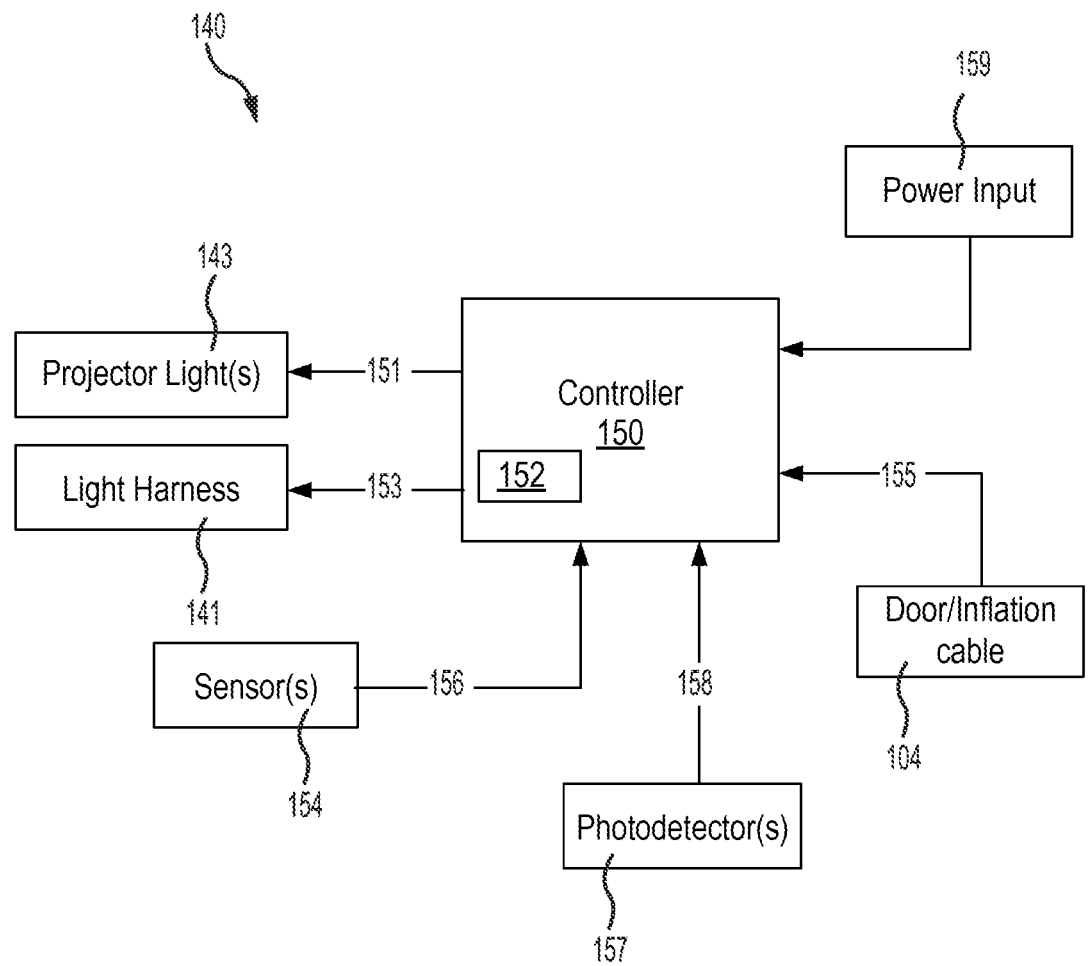
FIG. 3 illustrates a schematic of an evacuation slide light system, in accordance with various embodiments.

With reference FIG. 3, a schematic of evacuation slide light system 140 is illustrated. With combined reference to FIGS. 2A, 2B, and 3, in accordance with various embodiments, evacuation slide light system 140 includes a controller 150 (shown schematically). Controller 150 is in operable communication with projector lights 143. In this regard, controller 150 is configured to control whether projector light 143 outputs the first image 144 or the second image 146. Stated differently, controller 150 sends commands 151 to projector lights 143.

Controller 150 may include one or more logic devices such as one or more of a central processing unit (CPU), an accelerated processing unit (APU), a digital signal processor (DSP), a field programmable gate array (FPGA), an application specific integrated circuit (ASIC), or the like (e.g., controller 150 may utilize one or more processors of any appropriate type/configuration, may utilize any appropriate processing architecture, or both). In various embodiments, controller 150 may further include a tangible, non-transitory computer-readable storage medium (or memory) 152 known in the art. Memory 152 may store instructions usable by the logic device(s) to perform operations and make determinations regarding the inflation state (e.g., pressure) of inflatable rail structure 130 and the image command 151 sent to projector lights 143. In this regard, the instructions may be for controlling evacuation slide light system 140. Any appropriate computer-readable type/configuration may be utilized as memory 152, any appropriate data storage architecture may be utilized by the memory 152, or both.

Controller 150 is electrically coupled to light harness 141. Controller 150 may begin providing current 153 (e.g. power) to light harness 141, and thereby cause non-projector lights 142 to become illuminated, in response to deployment of evacuation slide 110. For example, controller 150 is configured to receive an inflation initiation signal 155 in response to evacuation slide being deployed (e.g., in response to exit door 104 being opening and/or in response to actuation of a manual inflation cable). Controller 150 begins outputting current to light harness 141 in response to receiving inflation initiation signal 155. In various embodiments, controller 150 is configured to cause projector lights 143 to emit the first image 144 (e.g., a stop sign, the word "stop," an "X") in response to deployment of evacuation slide 110 (e.g., in response to receive inflation initiation signal 155).

It may be desirable for evacuation slide 110 to have a sufficient rigidity or beam strength, when in the fully inflated state, for evacuees to jump onto the sliding surface 120 of evacuation slide 110 and slide down to exit surface 124 and/or to maintain buoyancy when employed as a life raft. In the fully inflated state, inflatable rail structure 130 may be inflated to at least a minimum pressure to provide sufficient beam strength to operate as a slide and/or to maintain buoyancy when operating as a life raft. For example, a pressure of 3.0 psi (20.7 kPA) may be a minimum pressure desired within inflatable rail structure 130.

In accordance with various embodiments, evacuation slide light system 140 includes one or more sensor(s) 154. Sensor(s) 154 is/are configured to monitor a pressure of inflatable rail structure 130 and/or a stretch of the material of inflatable rail structure 130. In this regard, sensor(s) 154 may include pressure sensor(s) and/or stretch sensor(s). For example, sensor 154 may include a piezoelectric sensor, a fiber bragg grating (FBG) sensor, a microelectromechanical system (MEMS) sensor, a pressure switch, or any other sensor capable of monitoring the pressure within inflatable rail structure 130 and/or the stretch of the material of inflatable rail structure 130.

The sensor(s) 154 are in operable communication (e.g., via a wired connection or a wireless connection) with controller 150. Sensor(s) 154 send signals 156 to controller 150. Sensor(s) 154 may begin sending signals 156 in response to deployment of evacuation slide 110. Signal 156 correlates to an inflation level and/or pressure of inflatable rail structure 130. In accordance with various embodiments, controller 150 is configured to control the image emitted by projector lights 143 based on the pressure of inflatable rail structure 130. Controller 150 determines the pressure of inflatable rail structure 130 based on signal 156.

In accordance with various embodiments, controller 150 is configured to compare the pressure of inflatable rail structure 130 to a beam (or first) threshold pressure (e.g., to the minimum pressure associated with sufficient beam strength for evacuation slide 110). If controller 150 determines that the pressure of inflatable rail structure 130 is less than the beam threshold pressure, controller 150 commands projector lights 143 to emit the first image 144. Stated differently, controller 150 commands projector lights 143 to emit the first image 144 in response to determining that the pressure of inflatable rail structure 130 is less than the beam threshold pressure. Controller 150 commands projector lights 143 to emit a second image 146, in response to determining that the pressure of inflatable rail structure 130 is greater than or equal to the beam threshold pressure. In this regard, controller 150 is configured to send a first command 151 configured to cause projector lights 143 to emit first image 144 when evacuation slide 110 is partially inflated and to send a second command 151 configured to cause projector lights 143 to emit second image 146 when evacuation slide 110 is fully inflated. Projector lights 143 emitting the first image 144 indicates to evacuees and crew that the evacuation slide 110 is not fully inflated and it is not safe to enter sliding surface 120. Projector lights 143 emitting the second image 146 and/or the projector lights 143 changing from the emitting first image 144 to emitting the second image 146 indicates to evacuees and/or crew that evacuation slide 110 is fully inflated and that it is safe to enter sliding surface 120.

In accordance with various embodiments, controller 150 is configured to monitor the pressure of evacuation slide 110 based on signals 156. If controller 150 determines the pressure of inflatable rail structure 130 has decreased to less than the beam threshold pressure (e.g., if inflatable rail structure 130 were to be punctured), controller 150 commands projector lights 143 to switch from emitting the second image 146 to emitting the first image 144, thereby indicating that evacuation slide 110 is not fully inflated. In this regard, controller 150 causes projector lights 143 to go from indicating that the evacuation slide 110 is safe to enter to indicating that the evacuation slide 110 is unsafe to enter, thereby allowing crew to divert evacuees to a difference exit door and evacuation slide.

In various embodiments, sensor(s) 154 may be located at a last area to inflate of inflatable rail structure 130. For example, in various embodiments, sensor(s) 154 may be located at toe end 116. In various embodiments, sensor(s) 154 may be located at head end 114 of evacuation slide 110 and controller 150 may be configured to monitor back-pressure flow characteristics and make decisions regarding projector lights 143 based on deployment pressure information stored in memory 152. In this regard, sensor(s) 154 may be located at any suitable location along inflatable rail structure 130.

In various embodiments, controller 150 may be configured to neglect pressure spikes associated with the release/separation of evacuation slide restraints, which are configured to control the deployment and unfolding of the evacuation slide 110. In this regard, controller 150 may be configured to compare the slide pressure, determined from the signals 156 from sensors 154, to the beam threshold pressure after all of the restraints have released, thereby allowing controller 150 to make better and/or more accurate decisions regarding the image to be emitted by projector lights 143.

In various embodiments, controller 150 may be configured to cause projector lights 143 to emit a complete failure image if the pressure of evacuation slide 110 does not reach the beam threshold pressure within a particular duration of time. For example, in various embodiments, controller 150 commands projector lights 143 to emit the first image 144 and starts a timer in response to receiving inflation initiation signal 155. At a preset duration of time after receiving the inflation initiation signal 155 (e.g., 1.0 second, 5.0 seconds, or any other desired duration) controller 150 may determine if the pressure of evacuation slide 110 is greater than the beam threshold pressure. If after the preset duration of time, the pressure of evacuation slide 110 is less than the beam threshold pressure, controller 150 may command projector lights 143 to change the image emitted by projector light 143 from the first image 144 to the complete failure image, thereby indicating to evacuees and crew that evacuation slide 110 is not inflating properly and that passengers should not continue waiting for the slide to inflate but should instead head towards a different exit.

Controller 150 receives power from a power input 159. In various embodiments, power input 159 is an aircraft power supply 160. In other words, aircraft power supply 160 may provide power to controller 150 and light harness 141. In various embodiments, controller 150 may be mounted proximate head end 114. Locating controller 150 proximate head end 114 may allow for relatively easy connection to aircraft power supply 160. In various embodiments, power input 159 may be a dedicated, stand-alone battery 162. In other words, battery 162 may only provide power to controller 150 and light harness 141. Battery 162 may provide redundancy should aircraft power supply 160 be unavailable.

In various embodiments, one or more photodetector(s) 157 may be in operable communication (e.g., via a wired connection or a wireless connection) with controller 150. Photodetectors 157 are configured to measure a brightness of the ambient light (e.g., sunlight) around evacuation slide 110. Photodetectors 157 may send light level signals 158 to controller 150. Controller 150 may control a brightness of images 144, 146 output by projector lights 143 based light level signals 158. For example, in various embodiments, if light level signals 158 indicate it is bright out, controller 150 may increase a brightness of images 144, 146 which can increase the visibility of images 144, 146. If light level signals 158 indicate it is dark out, controller 150 may decrease a brightness of images 144, 146 which can save power.

Figure 4A:
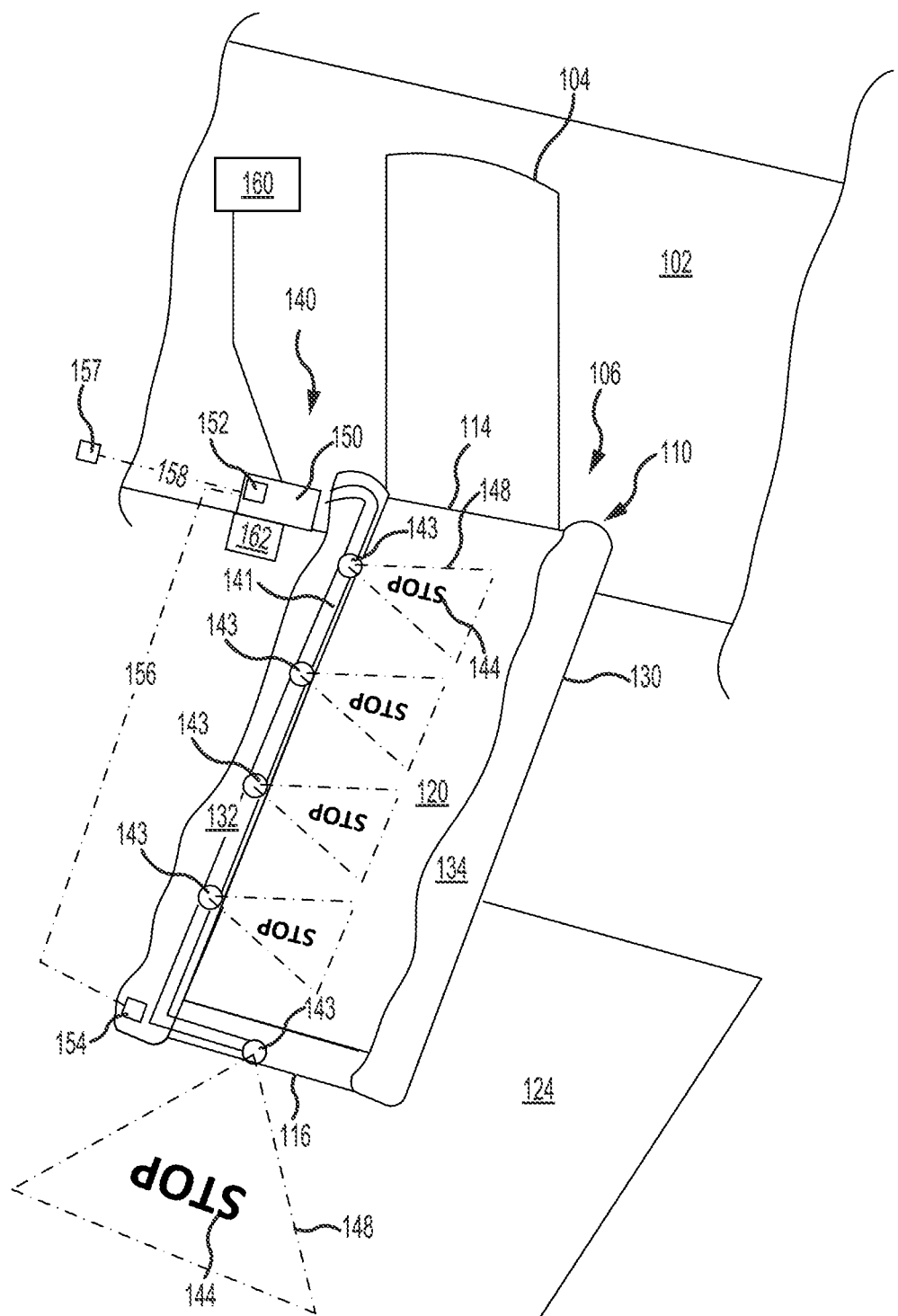
FIG. 4A illustrates an evacuation slide in a partially inflated state, in accordance with various embodiments.
Figure 4B:
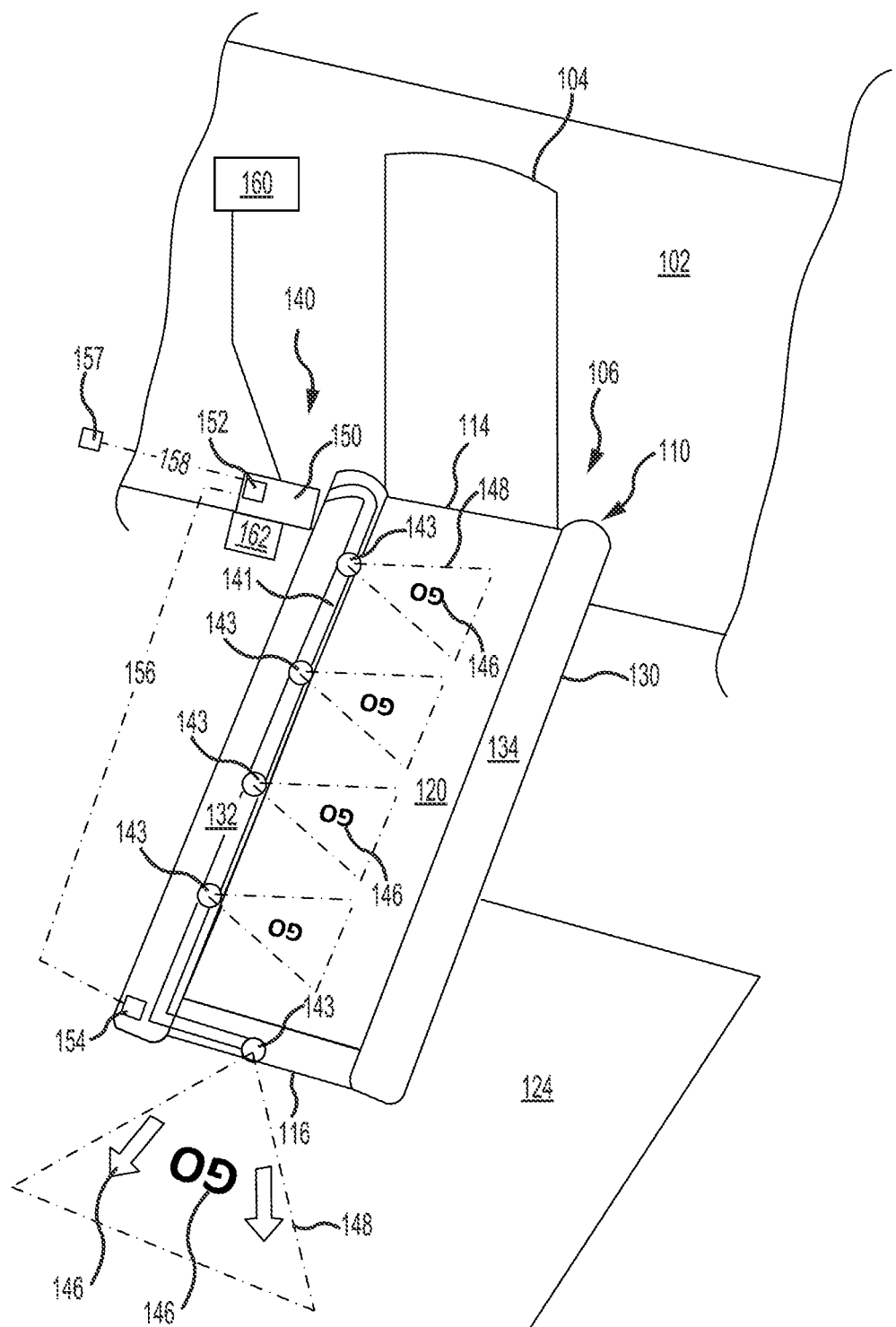
FIG. 4B illustrates an evacuation slide in a fully inflated state, in accordance with various embodiments.
Figure 5:
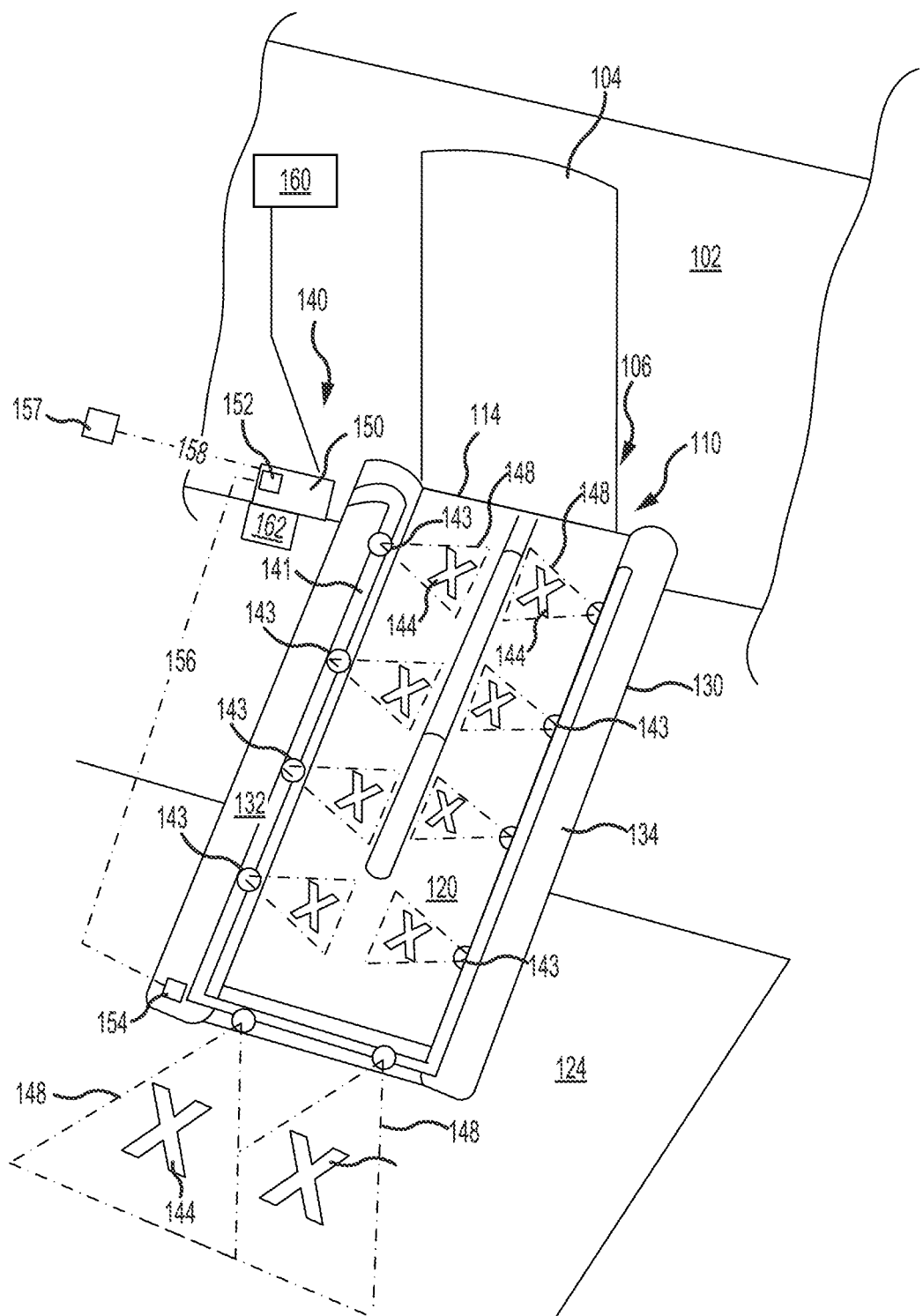
FIG. 5 illustrates an evacuation slide in a partially inflated state, in accordance with various embodiments.

With reference to FIGS. 4A and 4B, in various embodiments, each of the lights on light harness 141 may be a projector lights 143. The first image 144 may be the word "STOP". The second image may be the word "GO". In various embodiments, the toe end projector light 143 may display both the word "GO" and an arrow symbol. In various embodiments, first image 144 may be a first color (e.g., red) and the second image 146 may be a second color different from the first color (e.g., green or white). In various embodiments, the color of illumination area 148 used with the first image 144 may be a first color (e.g., red) and the color of illumination area 148 used with second image 146 may be a second color different from the first color (e.g., green or white). With reference to FIG. 5, in various embodiments, projector lights 143 may be located along first siderail 132 and along second siderail 134.

Figure 6A:
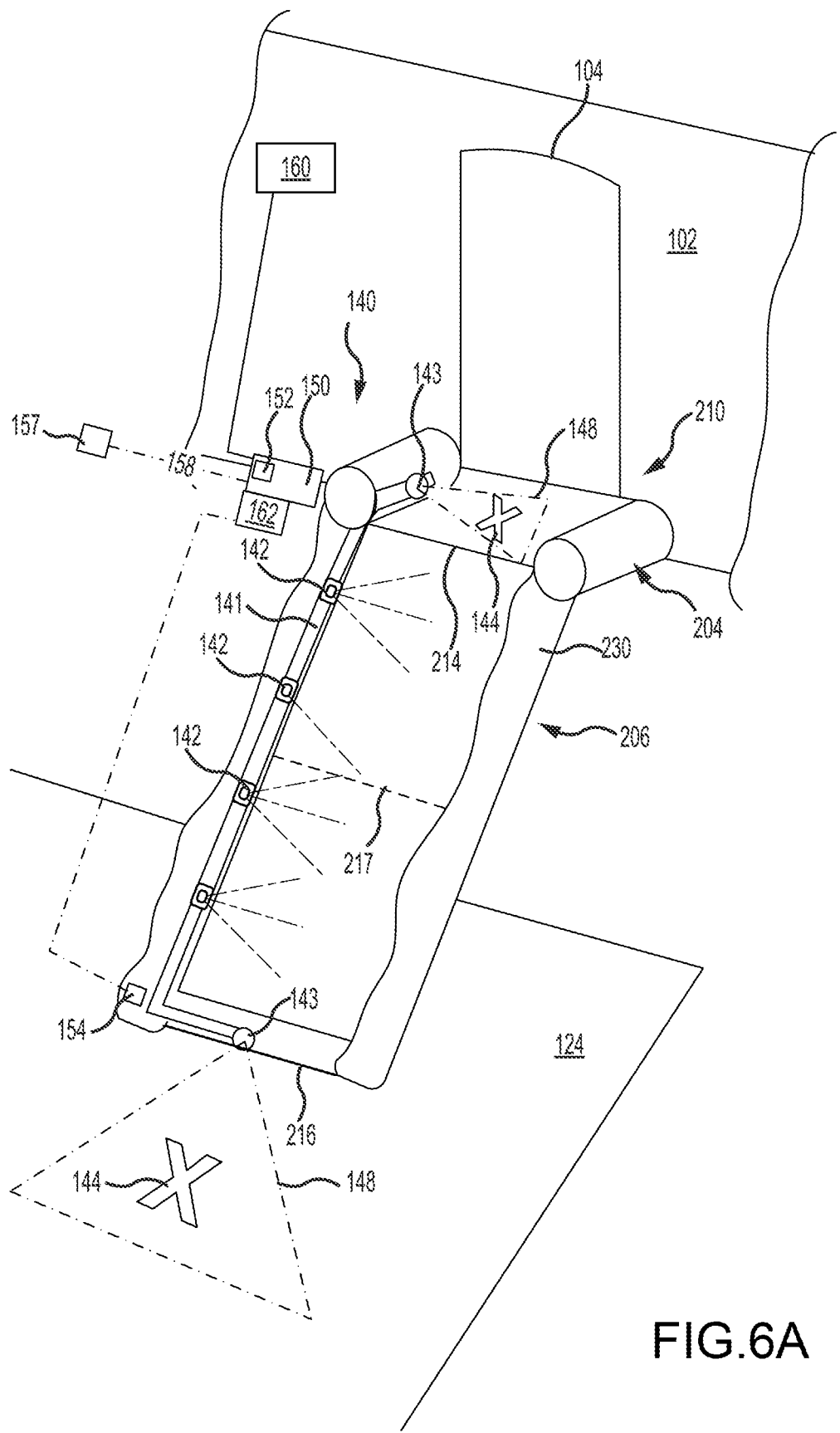
FIGS. 6A and 6B illustrates an evacuation slide in a partially inflated state and a fully inflated state, respectively, in accordance with various embodiments.
Figure 6B:
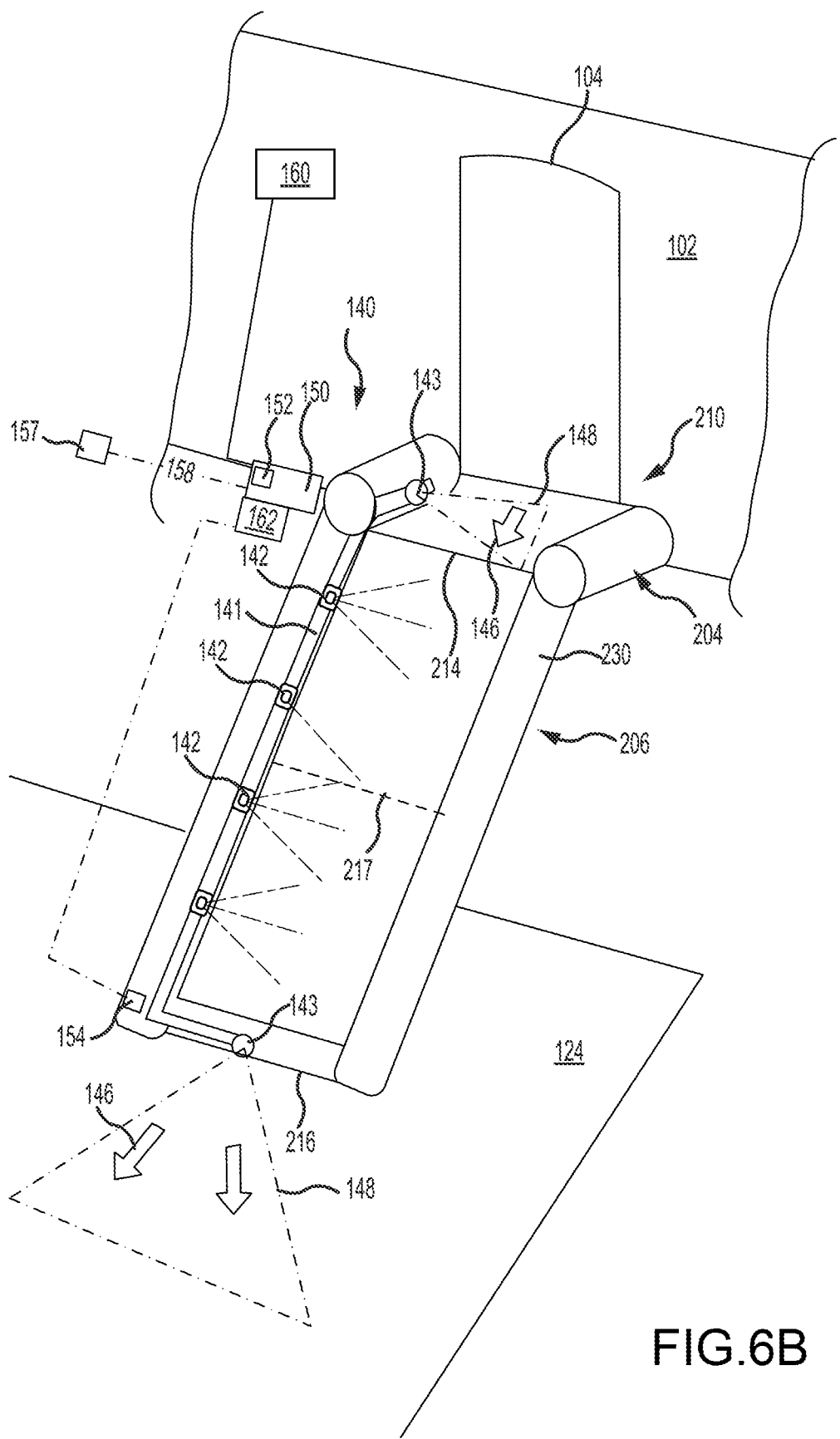

With reference to FIGS. 6A and 6B, in various embodiments, an evacuation slide 210 having a ramp portion 204 and a slide portion 206 is illustrated. Ramp portion 204 extends from exit door 104 to head end 214 of slide portion 206 may be coupled to an aircraft structure, such as, for example, fuselage 102. Slide portion 206 includes head end 214 and toe end 216 and extends from ramp portion 214 to exit surface 124. In various embodiments, projector lights 143 may be located along ramp portion 204 and toe end 216, and non-projector lights 142 may be located along the siderail(s) 230 of slide portion 206. In various embodiments, projector lights 143 may be located along ramp portion 204, toe end 216, and an upper (or head end) portion of siderail(s) 230, and non-projector lights 142 may be located along a lower portion of siderail(s) 230. The upper portion of siderail(s) 230 is located between head end 214 and a midpoint 217 between head end 214 and toe end 216. The lower portion of siderail(s) 230 is located between the midpoint 217 and toe end 216.

Figure 7:
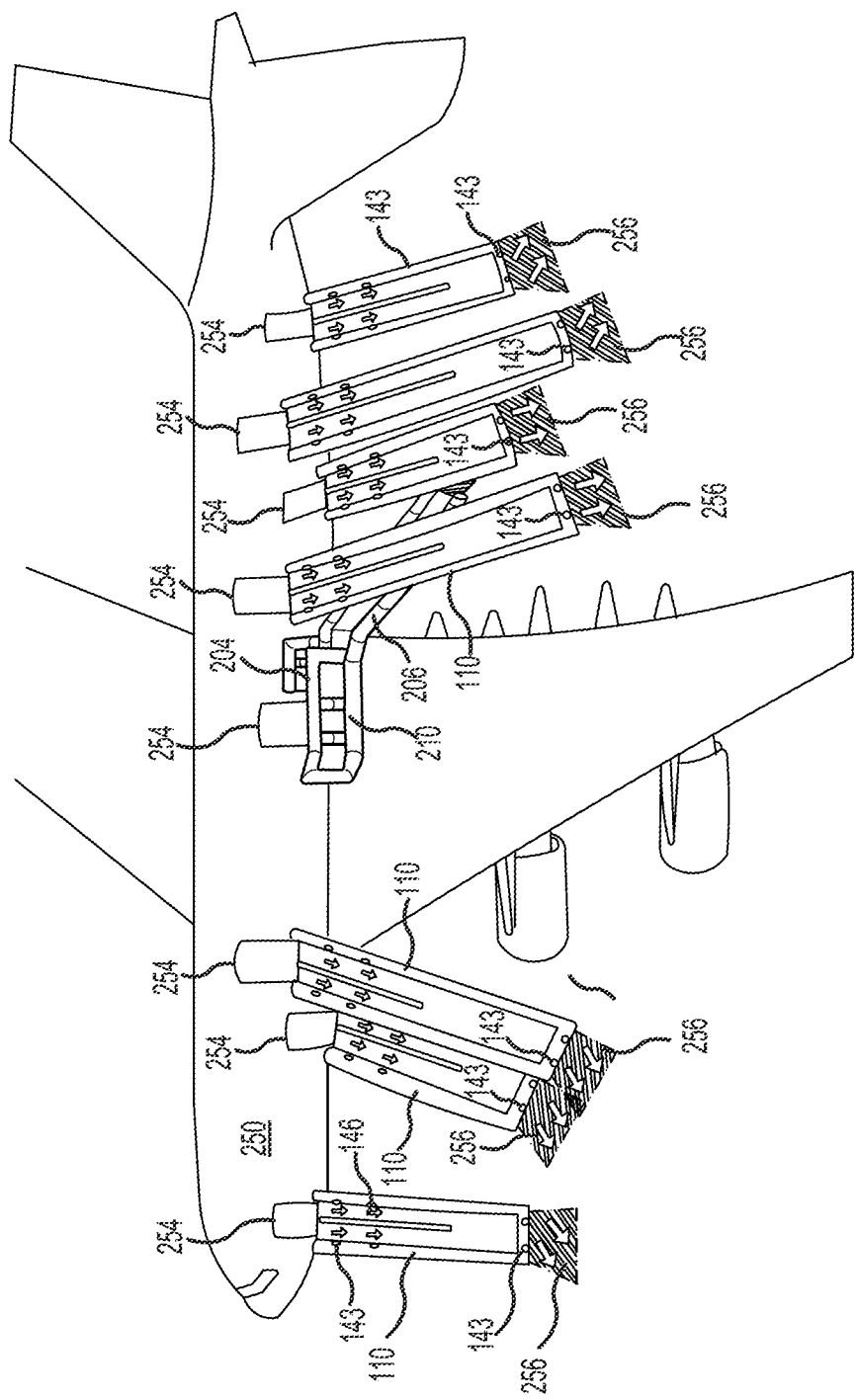
FIG. 7 illustrates an aircraft having multiple evacuation slides with the projector lights indicating an evacuation direction at a toe end of the slides, in accordance with various embodiments.

With reference to FIG. 7, an aircraft 250 having multiple evacuation slides 110, 210 deployed from exit doors 254 of aircraft 250 is illustrated. In FIG. 7, evacuation slides 110, 210 are fully deployed. In various embodiments, the projector lights 143 at the toe end 116 of the evacuation slides 110, 210 may project a caution, or warning, image 256. Caution image 256 is configured to convey to evacuees that they should move away from the slide and/or avoid the area at the toe end of other slides. For example, the caution image 256 may include diagonally oriented black and yellow stripes located in the area around the slide tow end. In various embodiments, arrows may be located in the caution images 256. The arrows may be configured to convey a direction in which evacuees should travel after exiting the sliding surface. Employing caution images 256 on the exit surface 124 at the toe end of the slides can reduce, or prevent, crowding at the toe end of the slides and/or may decrease occurrences of an evacuee from one slide entering the exit path of an evacuee on from a different slide. Reducing crowding and providing directional guidance tends to decrease evacuation times and increase evacuation safety.

Figure 8A:
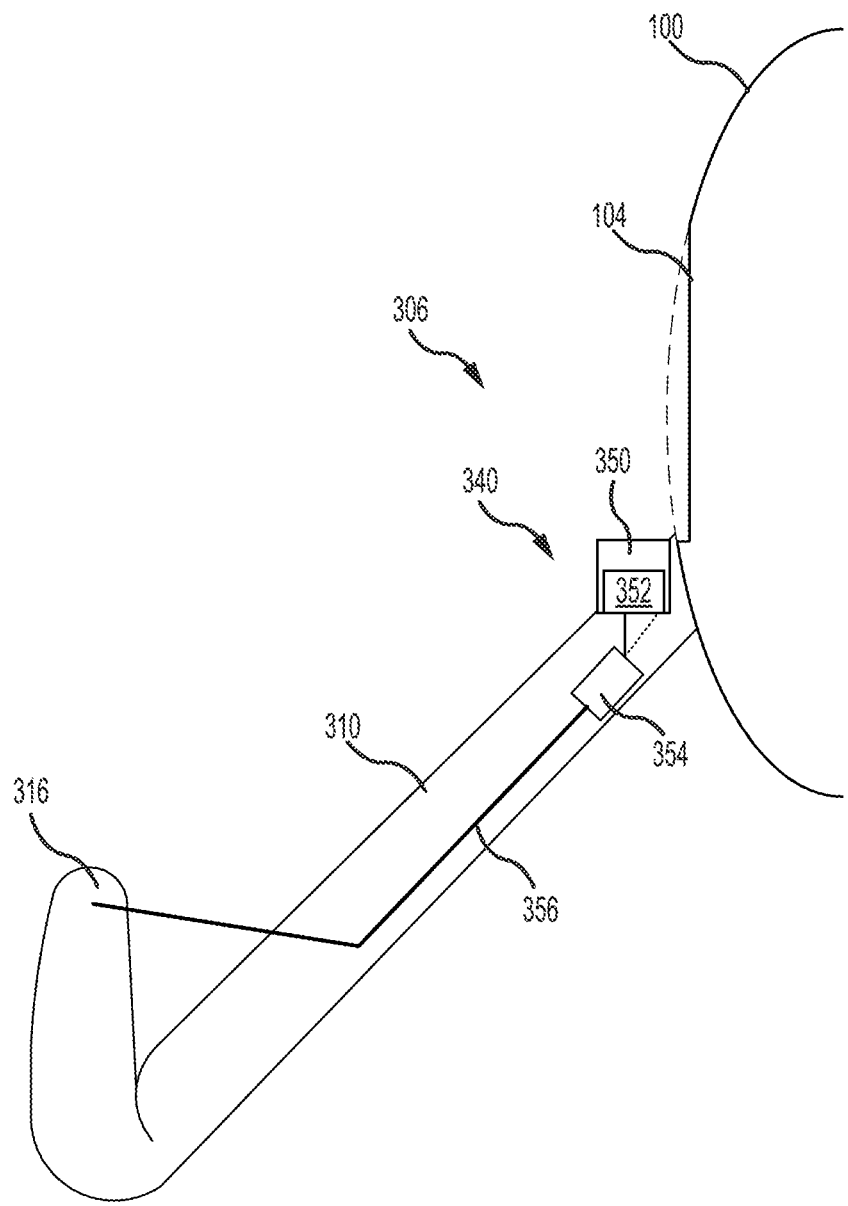
FIGS. 8A and 8B illustrate an evacuation slide in a partially inflated state and a fully inflated state, respectively, in accordance with various embodiments.
Figure 8B:
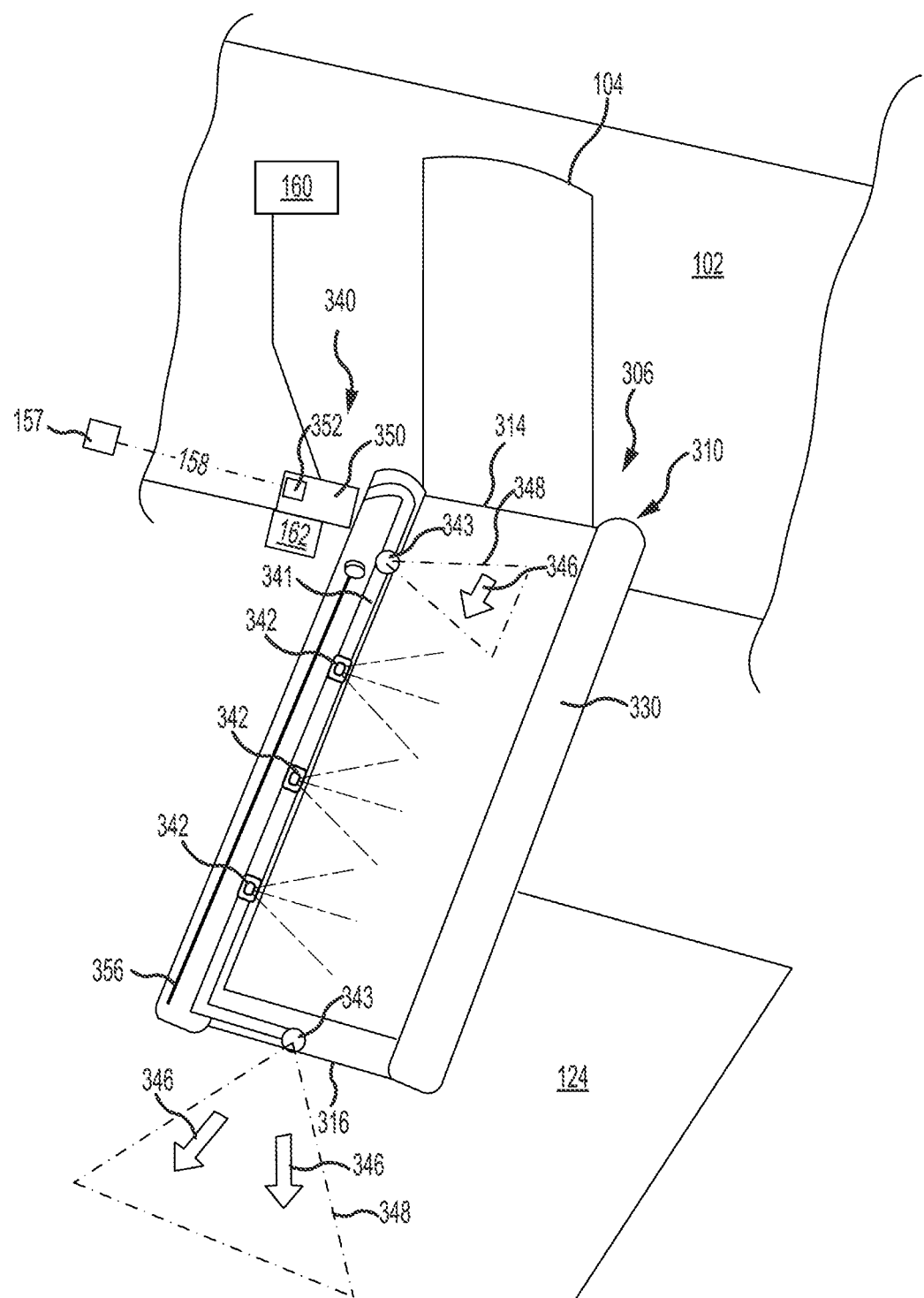

With reference to FIGS. 8A and 8B, an evacuation assembly 306 is illustrated with an evacuation slide 310 of the evacuation assembly 306 in a folded position (also referred to as a partially deployed position) and in a fully deployed position, respectfully. In various embodiments, aircraft 100 may include evacuation assembly 306 in place of evacuation assembly 106, with momentary reference to FIG. 1. Evacuation slide 310 is configured to deploy from an exit door 104 of aircraft 100.

In accordance with various embodiments, evacuation slide 310 includes an evacuation slide light system 340. Evacuation slide light system 340 includes a light harness 341 having one or more projector lights 343, similar to projector lights 143 in evacuation slide light system 140. In various embodiments, light harness 341 may also include non-projector lights 342.

Evacuation slide light system 340 includes a controller 350 and a memory, similar to controller 150 and memory 152, respectively, in FIG. 3. Controller 350 is operably coupled to projector lights 343. Controller 350 is configured to command projector lights 343 to emit a first image (e.g., a stop sign, the word "stop," an "X") upon deployment of evacuation slide 310. In this regard, the controller 350 may receive an inflation initiation signal in response to evacuation slide 310 deploying (e.g., in response to exit door 104 being opened, in response to depression of a button, in response to actuation of a lever, etc.). In response to receiving the inflation initiation signal, controller 350 may command projector lights 343 to emit the first image (e.g., a stop sign, the word "stop," an "X").

A switch 354 may be in operable communication with controller 350. Switch 354 may be configured to translate between a first state (or position) and a second state (or position). Controller 350 may be configured to determine whether switch 354 is in the first state or the second state.

A lanyard 356 may be coupled between switch 354 and evacuation slide 310. In various embodiments, lanyard 356 may be coupled between switch 354 and a toe end 316 of evacuation slide 310. In accordance with various embodiments, lanyard 356 is configured to translate switch 354 from the first state (FIG. 9A) to the second state (FIG. 9B) in response to evacuation slide 310 fully deploying. Stated differently, lanyard 356 is coupled to evacuation slide 310 such that lanyard 356 will translate switch 354 from the first state to the second state in response to pressure of evacuation slide 310 equaling and/or exceeding the beam threshold pressure. In accordance with various embodiments, the translation of switch 354 from the first state to the second state causes controller 350 command projector lights 343 to emit the second image 346 (e.g., a green arrow, the word "GO", etc.), thereby indicating to evacuees and crew that evacuation slide 310 is safe enter.

Figure 9A:
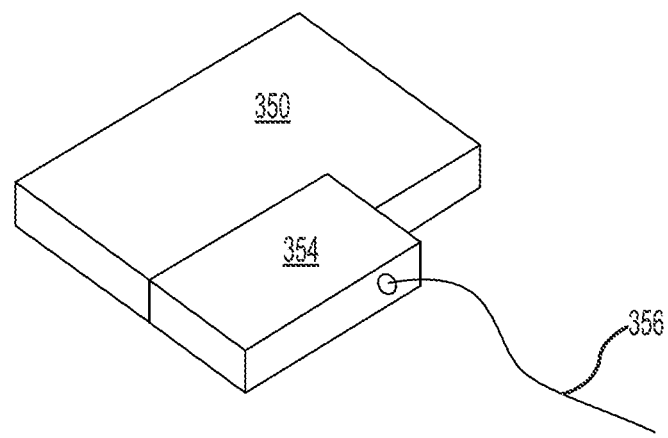
FIGS. 9A and 9B illustrate a lanyard coupled to a switch of an evacuation slide light system and separated from the switch of the evacuation slide light system, respectively, in accordance with various embodiments.
Figure 9B:
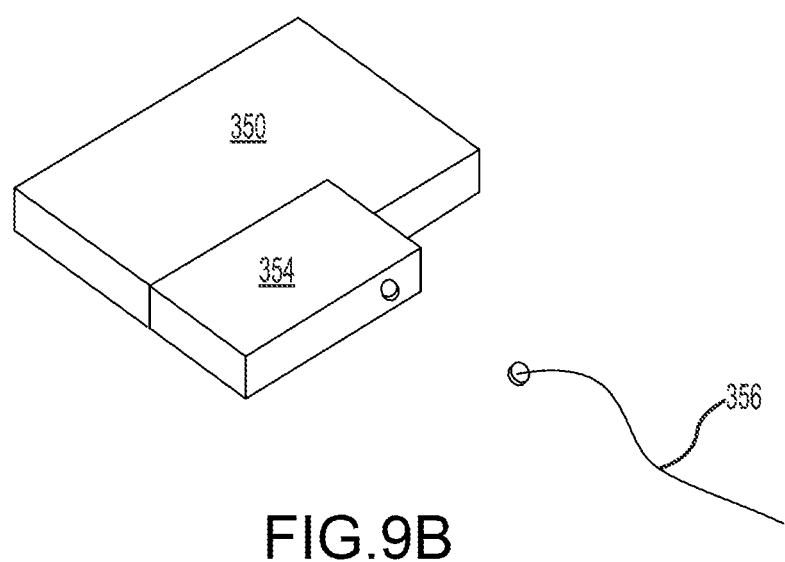

With reference to FIGS. 9A and 9B, in various embodiments, lanyard 356 may be configured to separate from switch 354 in response to evacuation slide 310 fully deploying. In FIG. 8A, lanyard 356 is attached to switch 354 (e.g., switch 354 is in the first state). Lanyard 356 may be attached to switch 354 prior to evacuation slide 310 fully deploying (e.g., prior to the pressure of evacuation slide 310 equaling and/or exceeding the beam threshold pressure). In accordance with various embodiments, lanyard 356 separates from switch 354, as shown in FIG. 9B, in response to the pressure of evacuation slide 310 equaling and/or exceeding the beam threshold pressure. Controller 350 is operably coupled to switch 354 and is configured determine if lanyard 356 is attached to or separated from switch 354. In various embodiments, switch 354 may send a signal to controller 350, in response to lanyard 356 separating from switch 354. In accordance with various embodiments, controller 350 is configured to command projector lights 343 to emit the second image 346 in response to determining lanyard 356 has separated from switch 354, thereby indicating to evacuees and crew that evacuation slide 310 is safe enter.

Figure 10:
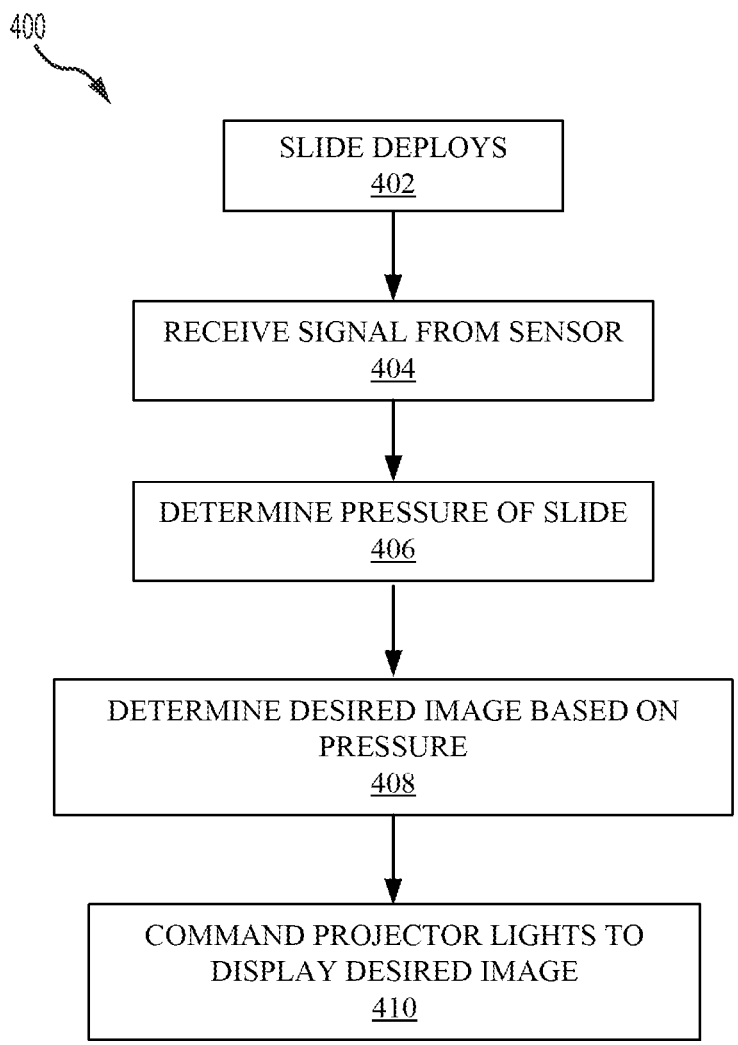
FIG. 10 illustrates a method for operating an evacuation slide light system, in accordance with various embodiments.

With reference to FIG. 10, a method 400 for controlling an evacuation slide system light system is illustrated. With combined reference to FIG. 10 and FIGS. 2A and 2B, method 400 may be performed by controller 150 to control evacuation slide light system 140. In accordance with various embodiments, method 400 may begin in response to deployment of evacuation slide 110 (step 402). In response to deployment of evacuation slide 110, controller 150 may begin receiving signal 156 from sensor 154 (step 404). Controller 150 may determine a pressure of the evacuation slide 110 (e.g., of inflatable rail structure 130) based on signal 156 from sensor 154 (step 406). Controller 150 may determine a desired image to be emitted by one or more projector lights 143 based on the pressure of evacuation slide 110 (step 408). Controller 150 command the projector light 143 to emit the desired image (step 410).

In various embodiments, controller 150 may be configured to command the projector light to emit a first image immediately upon deployment of the evacuation slide 110. For example, in various embodiments, step 402 may include controller 150 receiving an inflation initiation signal 155. In response to receiving the inflation initiation signal 155, controller 150 may command the projector light 143 to emit a first image 144.

In various embodiments, step 408 may include comparing the pressure of the evacuation slide 110 to a threshold pressure. In various embodiments, controller 150 is configured to command the projector light 143 to emit the first image 144 in response to determining that pressure of evacuation slide 110 is less than the threshold pressure, and to command projector light 143 to emit a second image 146 in response to determining the pressure of the evacuation slide is greater than or equal than the threshold pressure.

In various embodiments, method 400 may include controller 150 determining whether the pressure of the evacuation slide is equal to or greater than the threshold pressure at a preselected duration of time after receiving of the inflation initiation signal 155. Controller 150 may command the projector light emit a complete failure image if at the preselected duration after receipt of the inflation initiation signal 155, the pressure of the evacuation slide is less than the threshold pressure.

Method 400 and evacuation slide light systems 140, 340 are configured to indicate a deployment status of the evacuation slide 110, 210, 310 (i.e., whether evacuation slide 110, 210, 310 is inflated sufficiently to safely evacuate passengers). Employing the evacuation slide's light system to indicate the slide's inflation status allows for a readiness indicator that is generally not affected by wind conditions and/or human factors and does not add additional components and/or weight to the evacuation assembly. Evacuation slide light systems 140, 340 can also inform first responders and/or ground personnel about the evacuation slide's deployment failure and/or malfunction. For example, ground personnel wanting to use the evacuation slide as a reentry device to the aircraft can determine the health and readiness of deployed evacuation slide for use as a reentry device based on the image emitted by projector light 143.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nutjten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation slide light system, comprising:
   a first sensor configured to measure a pressure of an evacuation slide;
   a second sensor configured to measure a stretch of a material of the evacuation slide;
   a controller configured to receive a first signal from the first sensor and a second signal from the second sensor; and
   a projector light located on an inflatable siderail of the evacuation slide, oriented toward a sliding surface of the evacuation slide, and operably coupled to the controller, wherein the controller is configured to determine the pressure of the evacuation slide based on the first signal received from the first sensor and to determine the stretch of the material of the evacuation slide based on the second signal from the second sensor, and wherein the controller is configured to command the projector light to emit a first image in response to determining the pressure of the evacuation slide is less than a threshold pressure and in response to determining the stretch of the material of the evacuation slide is less than a threshold stretch and to emit a second image in response to determining the pressure of the evacuation slide is greater than or equal to the threshold pressure.

2. The evacuation slide light system of claim 1, wherein the controller is configured to monitor the pressure of the evacuation slide using the signal received from the sensor, and wherein the controller is configured to cause an image emitted by the projector light to change from the second image to the first image in response to determining the pressure of the evacuation slide has decreased to below the threshold pressure, wherein the threshold pressure is 3.0 pounds per square inch (psi).

3. The evacuation slide light system of claim 2, wherein the controller is configured to command the projector light to output an illumination area having a first color in response to receiving an inflation initiation signal, and wherein the controller is configured to command the projector light to change a color of the illumination area from the first color to a second color in response to determining the pressure of the evacuation slide is greater than or equal to the threshold pressure.

4. The evacuation slide light system of claim 1, wherein the controller is configured to receive an inflation initiation signal in response to the evacuation slide being deployed, and wherein the controller is configured to cause the projector light to emit a complete failure image in response to determining the pressure of the evacuation slide has not reached the threshold pressure within a threshold duration of time after receiving the inflation initiation signal.

5. The evacuation slide light system of claim 1, wherein the first image comprises at least one of an X, a stop word, or a red octagonal stop sign.

6. The evacuation slide light system of claim 2, wherein the second image comprises at least one of a green arrow, a white arrow, or a go word.

7. The evacuation slide light system of claim 1, further comprising a photodetector operably coupled the controller, wherein the controller determines a brightness for the projector light based on a light level signal received from the photodetector.

8. An article of manufacture including a tangible, non-transitory computer-readable storage medium having instructions stored thereon for controlling an evacuation slide light system, the instructions, in response to execution by a controller, cause the controller to perform operations comprising:
   receiving, by the controller, a first signal from a first sensor operably coupled to an evacuation slide;
   determining, by the controller, a pressure of the evacuation slide based on the first signal from the first sensor;
   receiving, by the controller, a second signal from a second sensor operably coupled to an evacuation slide;
   determining, by the controller, a stretch of a material of the evacuation slide based on the signal from the second sensor;
   determining, by the controller, a desired image to be emitted by a projector light based on the pressure of the evacuation slide and the stretch of a material of the evacuation slide; and
   commanding, by the controller, the projector light to emit the desired image.

9. The article of claim 8, wherein determining, by the controller, the desired image comprises comparing, by the controller, the pressure of the evacuation slide to a threshold pressure, wherein the threshold pressure is 3.0 psi.

10. The article of claim 9, wherein commanding, by the controller, the projector light to emit the desired image comprises commanding, by the controller, the projector light to display a first image on a sliding surface of the evacuation slide in response to the controller determining the pressure of the evacuation slide is less than the threshold pressure, wherein the projector light is located on an inflatable siderail structure of the evacuation slide.

11. The article of claim 10, wherein commanding, by the controller, the projector light to emit the desired image comprises commanding, by the controller, the projector light to display a second image in response to the controller determining the pressure of the evacuation slide is greater than or equal to the threshold pressure.

12. The article of claim 11, wherein the first image comprises at least one of an X, a stop word, or a red octagonal stop sign, and wherein the second image comprises at least one of a green arrow, a white arrow, or a go word.

13. The article of claim 8, wherein the sensor is configured to measure a stretch of a material of the evacuation slide.

14. The article of claim 8, wherein the operations further comprise:
   receiving, by the controller, an inflation initiation signal;
   commanding, by the controller, the projector light to emit a first image in response to receiving the inflation initiation signal;

determining, by the controller, whether the pressure of the evacuation slide is equal to or greater than a threshold pressure at a preselected duration of time after receipt of the inflation initiation signal; and commanding, by the controller, the projector light to emit a complete failure image in response to determining that at the preselected duration of time the pressure of the evacuation slide is less than the threshold pressure.

15. An evacuation slide, comprising:
an inflatable rail structure;
a sliding surface;
a first sensor configured to measure a pressure of an evacuation slide;
a second sensor configured to measure a stretch of a material of the evacuation slide;
a controller configured to receive a pressure signal from the first sensor and a stretch signal from the second sensor; and
an evacuation slide light system coupled to the inflatable rail structure, the evacuation slide light system including a plurality of projector lights located along the inflatable rail structure and a plurality of standard lights located along the inflatable rail structure;
wherein the plurality of standard lights creates a plurality of first illumination areas that do not include an image;
wherein the plurality of projector lights creates a plurality of second illumination areas that include at least one of an image, a word, a shape, a symbol, or design;
wherein the controller determines the at least of the image, the word, the shape, the symbol, or the design based on the pressure signal and the stretch signal, and wherein the plurality of projector lights is oriented toward the sliding surface.

16. The evacuation slide of claim 15, wherein the evacuation slide light system further comprises:
a switch;
a lanyard coupled to the inflatable rail structure and configured to translate the switch between a first state and a second state; and
a controller coupled to the switch, wherein the controller is configured to determine whether the switch is in the first state or the second state, and wherein the controller is configured to command the plurality of projector lights to emit a first image in response to determining the switch is in the first state, and wherein the controller is configured to command the plurality of projector lights to emit a second image in response to determining the switch is in the second state.

17. The evacuation slide of claim 16, wherein the lanyard is coupled to a toe end of the evacuation slide.

18. The evacuation slide of claim 15, wherein the evacuation slide light system further comprises:
a sensor configured to measure at least one of a pressure of the evacuation slide or a stretch of a material of the evacuation slide; and
a controller configured to receive a signal from the sensor, wherein the controller is configured to determine the pressure of the evacuation slide based on the signal received from the sensor, and wherein the controller is configured to command the plurality of projector lights to emit a first image in response to determining the pressure of the evacuation slide is less than a threshold pressure and to emit a second image in response to determining the pressure of the evacuation slide is greater than or equal to the threshold pressure.

19. The evacuation slide of claim 16, wherein a first projector light of the plurality of projector lights is located at a toe end of the evacuation slide.

20. The evacuation slide of claim 19, wherein the first projector light is configured to output a caution image including a plurality of diagonally oriented yellow and black stripes.

* * * * *